Patented Feb. 14, 1928.

1,659,075

UNITED STATES PATENT OFFICE.

STEVEN G. BEDLOVITZ, OF CLEVELAND, OHIO, ASSIGNOR TO THE ELECTRO COMPOUND COMPANY, OF CLEVELAND, OHIO, A CORPORATION OF OHIO.

LUBRICATING COMPOUND AND METHOD OF MAKING SAME.

No Drawing. Application filed February 19, 1924. Serial No. 693,904.

This invention relates to lubricating compounds, and more particularly to a compound for lubricating wire and the method of making same.

The principal object of the invention is to provide a lubricating compound for applying to the surfaces of electrical wires and cables to cause the wires and cables to slide more easily through conduits and especially around the right angle turns thereof.

Another object of the invention is to provide a lubricating compound for said purpose consisting of ingredients which are in no way detrimental to the wires or cables or insulating covering thereof, or the conduits in which the wires and cables are enclosed.

In order that the invention may be clearly understood, the same will be hereinafter fully described, and the novel features thereof particularly pointed out in the appended claim.

This lubricating compound is of a foamy appearance and consists of a mixture of approximately 88.83 per cent moisture, 3.00 per cent cotton-seed oil, 5.84 per cent potassium hydroxide, and 2.33 per cent elm bark.

The method of producing the lubricating compound will now be described; the cottonseed oil and the potassium hydroxide are placed in cold or lukewarm water held in a suitable vessel for boiling said mixture, all ingredients being in approximately the proportions given above. The vessel is heated for the purpose of boiling said mixture contained therein, and said mixture is stirred slowly and continuously by means of a paddle from the beginning until the mixture is heated to 212 degrees Fahrenheit, then the elm bark, which has been previously reduced to a soluble extract by boiling it, is added thereto as said stirring thereof continues, then the boiling mixture is poured into smaller vessels in order that it may cool, and while the mixture is cooling, it is beaten lively with a paddle until completely cool.

Having fully described my invention, what I claim is:

A lubricating compound for electrical wires consisting of a mixture the constituent ingredients of which are 88.83 per cent water, 3.00 per cent cottonseed oil, 5.84 per cent potassium hydroxide, and 2.33 per cent soluble extract of elm bark.

In testimony whereof I affix my signature.

STEVEN G. BEDLOVITZ.